(12) United States Patent
Jamadagni et al.

(10) Patent No.: US 9,420,608 B2
(45) Date of Patent: Aug. 16, 2016

(54) ACCESS CONTROL METHOD AND DEVICE FOR MACHINE TYPE COMMUNICATIONS IN A WIRELESS COMMUNICATION NETWORK ENVIRONMENT

(75) Inventors: Satish Nanjunda Swamy Jamadagni, Bangalore (IN); Sarvesha Anegundi Ganapathi, Bangalore (IN); Pradeep Krishnamurthy Hirisave, Bangalore (IN)

(73) Assignee: Samsung Electronics Co., Ltd (KR)

( * ) Notice: Subject to any disclaimer, the term of this patent is extended or adjusted under 35 U.S.C. 154(b) by 466 days.

(21) Appl. No.: 13/641,631

(22) PCT Filed: Apr. 18, 2011

(86) PCT No.: PCT/KR2011/002764
§ 371 (c)(1),
(2), (4) Date: Oct. 16, 2012

(87) PCT Pub. No.: WO2011/129674
PCT Pub. Date: Oct. 20, 2011

(65) Prior Publication Data
US 2013/0039317 A1 Feb. 14, 2013

(30) Foreign Application Priority Data
Apr. 16, 2010 (IN) .......................... 1081/CHE/2010

(51) Int. Cl.
*H04W 72/04* (2009.01)
*H04W 74/00* (2009.01)
(Continued)

(52) U.S. Cl.
CPC ............ *H04W 74/006* (2013.01); *H04W 4/005* (2013.01); *H04W 4/06* (2013.01)

(58) Field of Classification Search
USPC ................................................. 370/329, 341
See application file for complete search history.

(56) References Cited

U.S. PATENT DOCUMENTS

| 2005/0015583 A1* | 1/2005 | Sarkkinen et al. ............ 713/150 |
|---|---|---|
| 2007/0169107 A1 | 7/2007 | Huttunen |

(Continued)

FOREIGN PATENT DOCUMENTS

EP 2129095 12/2009

OTHER PUBLICATIONS

PCT/ISA/237 Written Opinion issued on PCT/KR2011/002764 (pp. 3).

(Continued)

*Primary Examiner* — Dang Ton
*Assistant Examiner* — Pamit Kaur
(74) *Attorney, Agent, or Firm* — The Farrell Law Firm, P.C.

(57) ABSTRACT

A Machine Type Communication (MTC) device and method of the MTC device are provided for establishing a connection with a base station in a wireless communication network environment. The method includes receiving, by the MTC device, a broadcast message from a base station over a Machine-to-Machine (M2M) broadcast control channel, wherein the broadcast message includes header information and at least one M2M-Random Access CHannel (mRACH) parameter; determining whether an mRACH message can be sent to the base station, based on the header information in the received broadcast message; sending the mRACH message to the base station using the at least one mRACH parameter to establish an uplink connection with the base station, when the mRACH message can be sent to the base station; and receiving a resource assignment message indicating a successful connection establishment with the base station, in response to the mRACH message.

12 Claims, 2 Drawing Sheets

(51) Int. Cl.
*H04W 4/00* (2009.01)
*H04W 4/06* (2009.01)

(56) References Cited

U.S. PATENT DOCUMENTS

| | | | |
|---|---|---|---|
| 2008/0153521 A1 | 6/2008 | Benaouda et al. | |
| 2009/0217348 A1 | 8/2009 | Salmela et al. | |
| 2009/0219864 A1* | 9/2009 | Parolari | 370/329 |
| 2010/0110988 A1* | 5/2010 | Marinier et al. | 370/328 |
| 2011/0256896 A1* | 10/2011 | Giaretta et al. | 455/509 |
| 2012/0213209 A1* | 8/2012 | Bergstrom et al. | 370/336 |

OTHER PUBLICATIONS

PCT/ISA/210 Search Report issued on PCT/KR2011/002764 (pp. 3).
3rd Generation Partnership Project; Technical Specification Group GSM/EDGE Radio Access Network; General Packet Radio Service (GPRS); Mobile Station (MS)—Base Station System (BSS) Interface; Radio Link Control/Medium Access Control (RLC/MAC) Protocol (Release 9), 3GPP TS 44.060 V9.3.0, Mar. 25, 2010, 604 pages.
3rd Generation Partnership Project; Technical Specification Group GSM/EDGE Radio Access Network; General Packet Radio Service (GPRS); Overall Description of the GPRS Radio Interface; Stage 2 (Release 9), 3GPP TS 43.064 V9.0.0, Nov. 30, 2009, 106 pages.
Alcatel-Lucent Shanghai Bell, "Discussion on RACH Design for MTC", R2-101407, 3GPP TSG RAN WG2 #69, Feburary 22-26, 2010, 2 pages.
Eberspcher et al., Improved Data Services in GSM: GPRS, HSCSD and EDGE, GSM: Architecture, Protocols and Services, Dec. 19, 2008, 36 pages.
Alcatel-Lucent Shanghai Bell, "Discussion on RACH Congestion for MTC", R2-102054, 3GPP TSG RAN WG2 #69bis, Apr. 12-16, 2010, 3 pages.
Vodafone, "Limitation of RACH Resources for MTC Devices", R2-101296, 3GPP TSG RAN WG2 #69, Feb. 22-26, 2010.
Samsung Electronics Co., "Access Control Mechanism for MTC Devices in GERAN", GP-100908, 3GPP GERAN # 46 W G2, May 18-20, 2010, 3 pages.
European Search Report dated May 3, 2016 issued in counterpart application No. 11769140.2-1854, 10 pages.

* cited by examiner

ACCESS CONTROL METHOD AND DEVICE FOR MACHINE TYPE COMMUNICATIONS IN A WIRELESS COMMUNICATION NETWORK ENVIRONMENT

PRIORITY

This application is a National Phase Entry of PCT International Application No. PCT/KR2011/002764, which was filed Apr. 18, 2011, and claims priority to Indian Patent Application No. 1081/CHE/2010, which was filed in the Indian Patent Office on Apr. 16, 2010, the content of each of which is incorporated herein by reference.

BACKGROUND OF THE INVENTION

1. Field of the Invention

The present invention relates generally to wireless communications, and more particularly, to an access control method and device for machine type communication in a wireless communication network environment.

2. Description of the Related Art

Machine Type Communication (MTC) is currently being discussed in the $3^{rd}$ Generation Partnership Project (3GPP) forum and the requirements for Machine-to-Machine (M2M) architecture have already been specified.

Further, a contention-based Random Access CHannel (RACH) procedure allows a large User Equipment (UE) population to use a limited number of RACH preambles to access the wireless communication network. However, when considering M2M devices, there is still a problem with a large number of Machine-Type Communication (MTC) devices accessing the wireless communication network at the same time.

Accordingly, the RACH capacity in a wireless communication network, such as Global System for Mobile communications (GSM) Enhanced Data rates for GSM Evolution (EDGE) Radio Access Network (GERAN) is a critical problem that should be solved in order to support a large number of devices in a GERAN cell.

One conventional solution uses a smart metering application that requires the MTC devices to send their data around the same time, e.g., every hour or during a limited time period during off peak hours. However, having such an application can result in a situation where a large number of MTC devices are trying to access the GERAN network at the same time. Such a phenomenon can be a disaster for normal legacy users, as the RACH resources would be effectively wiped out. Further, even the MTC devices may suffer from RACH failures due to successive contention failure.

SUMMARY OF THE INVENTION

Accordingly, the present invention is designed to address at least the problems and/or disadvantages described above and to provide at least the advantages described below.

An aspect of the present invention is to provide a method and device for access control of MTC in a wireless communication network environment.

In accordance with an aspect of the present invention, a method of an MTC device is provided for establishing a connection with a base station in a wireless communication network environment. The method includes receiving, by the MTC device, a broadcast message from a base station over a Machine-to-Machine (M2M) broadcast control channel, wherein the broadcast message includes header information and at least one M2M-Random Access CHannel (mRACH) parameter; determining whether an mRACH message can be sent to the base station, based on the header information in the received broadcast message; sending the mRACH message to the base station using the at least one mRACH parameter to establish an uplink connection with the base station, when the mRACH message can be sent to the base station; and receiving a resource assignment message indicating a successful connection establishment with the base station, in response to the mRACH message.

In accordance with another aspect of the present invention, an MTC device is provided, which includes a processor, and a memory. The memory is configured to temporarily store instructions, that when executed by the processor, cause the processor to perform a method described above.

BRIEF DESCRIPTION OF THE DRAWINGS

The above and other aspects, features, and advantages of certain embodiments of the present invention will be more apparent from the following detailed description taken in conjunction with the accompanying drawings, in which.

The drawings described herein are for illustration purposes only and are not intended to limit the scope of the present disclosure.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
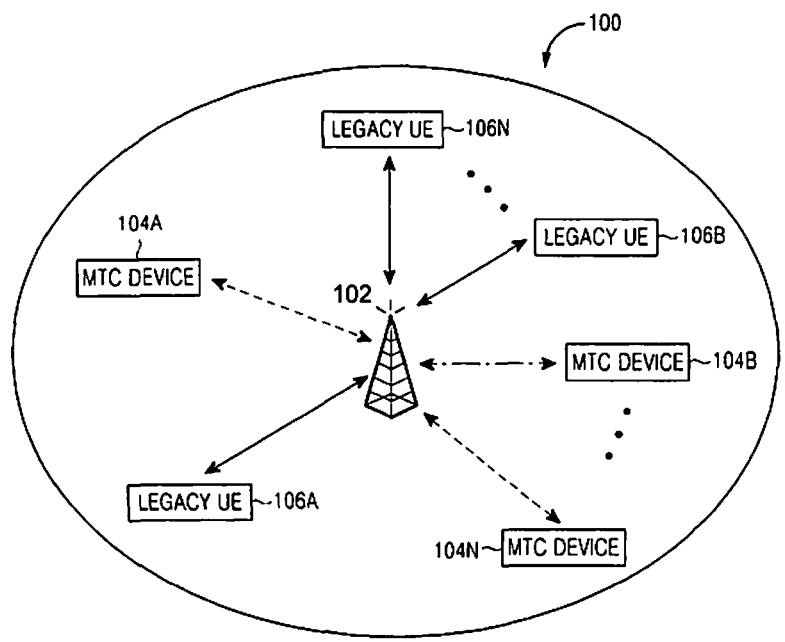
FIG. 1 is a system diagram illustrating a GERAN according to an embodiment of the present invention.

FIG. 1 is a system diagram illustrating a GERAN according to an embodiment of the present invention.

Referring to FIG. 1, the GERAN network 100 includes a base station 102, MTC devices 104A-N, and legacy UEs 106A-N. For example, the MTC devices 104A-N include cameras, microphones, consumer electronic devices, sensor nodes, televisions with embedded modems, etc., and the legacy UEs 106A-N include mobile phones, personal digital assistants, etc.

The MTC devices 104A-N are programmed to listen to one or more broadcast messages, upon synchronizing with the base station 102. For example, the instructions to listen to broadcast messages are programmed in a Subscriber Identity Module (SIM) card installed in the MTC devices 104A-N. Alternatively, the instructions may be communicated in a M2M Broadcast Control CHannel (mBCCH) message to the MTC devices 104A-N. Accordingly, the MTC devices 104A-N do not send a RACH message over a RACH channel (e.g., like the legacy UEs 106A-N) for establishing an uplink connection with the base station 102, after synchronizing with the base station 102. Instead, the MTC devices 104A-N listen to the broadcast messages.

The base station 102 periodically transmits a broadcast message including header information and M2M RACH (mRACH) parameters over an mBCCH. The mRACH parameters control mRACH utilization for the M2M devices 104A-N. The mRACH parameters include a maximum number of allowed retransmissions, a number of slots to spread transmission, a cell barred from access, and allowed call re-establishment. An exemplary mRACH parameter information element is shown below in Table 1.

TABLE 1

| Max retrans, Maximum number of retransmissions (octet 2) | | |
|---|---|---|
| Bits | | |
| 8 | 7 | |
| 0 | 0 | Maximum 1 retransmission |
| 0 | 1 | Maximum 2 retransmissions |
| 1 | 0 | Maximum 4 retransmissions |
| 1 | 1 | Maximum 7 retransmissions |

| Tx-integer, Number of slots to spread transmission (octet 2) | | | | |
|---|---|---|---|---|
| Bits | | | | |
| 6 | 5 | 4 | 3 | |
| 0 | 0 | 0 | 0 | 3 slots used to spread transmission |
| 0 | 0 | 0 | 1 | 4 slots used to spread transmission |
| 0 | 0 | 1 | 0 | 5 slots used to spread transmission |
| 0 | 0 | 1 | 1 | 6 slots used to spread transmission |
| 0 | 1 | 0 | 0 | 7 slots used to spread transmission |
| 0 | 1 | 0 | 1 | 8 slots used to spread transmission |

| CELL_BAR_ACCESS, Cell Barred for Access (octet 2) | |
|---|---|
| Bit 2 | |
| 0 | The cell is not barred, |
| 1 | The cell is barred, |

| RE, Call reestablishment allowed (octet 2) | |
|---|---|
| Bit 1 | |
| 0 | Call Reestablishment allowed in the cell |
| 1 | Call Reestablishment not allowed in the cell |

AC CN, Access Control Class N (octet 3(except bit 3) and octet 4) For a mobile station with AC C = N access is not barred if the AC CN bit is coded with a "0"; N = 0, 1, ... 9, 11, ..., 15.

In Table 1, the mRACH parameters are different from RACH parameters associated with the legacy UEs 106A-N. After receiving the broadcast message, each of the MTC devices 104A-N decodes the header information in the broadcast message and determines whether the mRACH message can be sent to the base station 102. If the mRACH message can be sent to the base station 102, one or more of the MTC devices 104A-N sends an mRACH message to the base station 102 using the mRACH parameters for establishing an uplink connection with the base station 102. After receiving the mRACH message, the base station 102 sends a resource assignment message indicating successful establishment of connection to the one or more of the MTC devices 104A-N.

Figure 2:
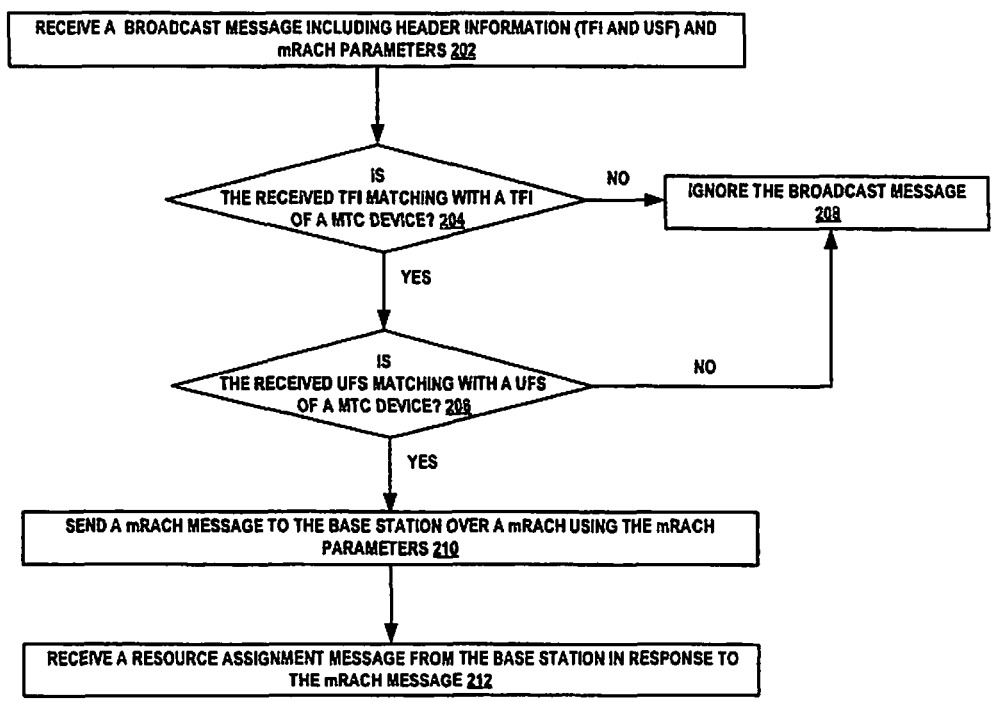
FIG. 2 is a flowchart illustrating a method of establishing a connection with a base station, according to an embodiment of the present invention.

FIG. 2 is a flowchart illustrating a method for establishing a connection with a base station, according to an embodiment of the present invention.

Referring to FIG. 2, in step 202, a broadcast message is received by a MTC device 104A from the base station 102. The broadcast message includes header information and mRACH parameters. The header information includes a Traffic Flow Indicator (TFI) and a Universal Standard Flag (USF). In step 204, the MTC device 104A determines whether the TFI in the broadcast message matches a TFI associated with the MTC device 104A. If the TFI matches, the MTC device 104A determines that the broadcast message is intended for the MTC devices 104A-N.

When the TFI in the broadcast message does not match the TFI associated with the MTC device 104A, the broadcast message is ignored in step 208.

However, when the TFI in the broadcast message matches the TFI associated with the MTC device 104A, the MTC device 104A determines whether the USF in the broadcast message matches a USF associated with the MTC device 104A in step 206.

When the USF in the broadcast message does not match the USF associated with the MTC device 104A, the broadcast message is ignored in step 208.

When the USF in the broadcast message matches the USF associated with the MTC device 104A, the MTC device 104A determines that mRACH parameters are intended for the MTC device 104A.

Accordingly, in step 210, an mRACH message is sent to the base station 102 over an assigned mRACH based on the mRACH parameters. The mRACH message is sent for establishing an uplink connection with the base station 102.

In step 212, a resource assignment message indicating successful connection establishment is received from the base station 102, in response to the mRACH message.

As a result, a connection is successfully established between the base station 102 and the MTC device 104A, through which the MTC device 104A starts transmitting burst of data to the base station over the mRACH.

In accordance with an embodiment of the present invention, the base station 102 indicates to the MTC device 104A in the broadcast message which of the time slots is to be used of the available four burst. For example, the base station 102 may indicate to the MTC device 104A that only 4 bursts of data are allowed for transmission in one block period.

Additionally, when network access behavior associated with the MTC device 104A is periodic, a notification is sent to the base station 102 using the assigned mRACH. Accordingly, allocation of a Reserved Radio Block Period (RRBP) is received from the base station 102 for communicating data with the base station 102. The MTC device 104A then communicates data to the base station 102 using the RRBP.

Figure 3:
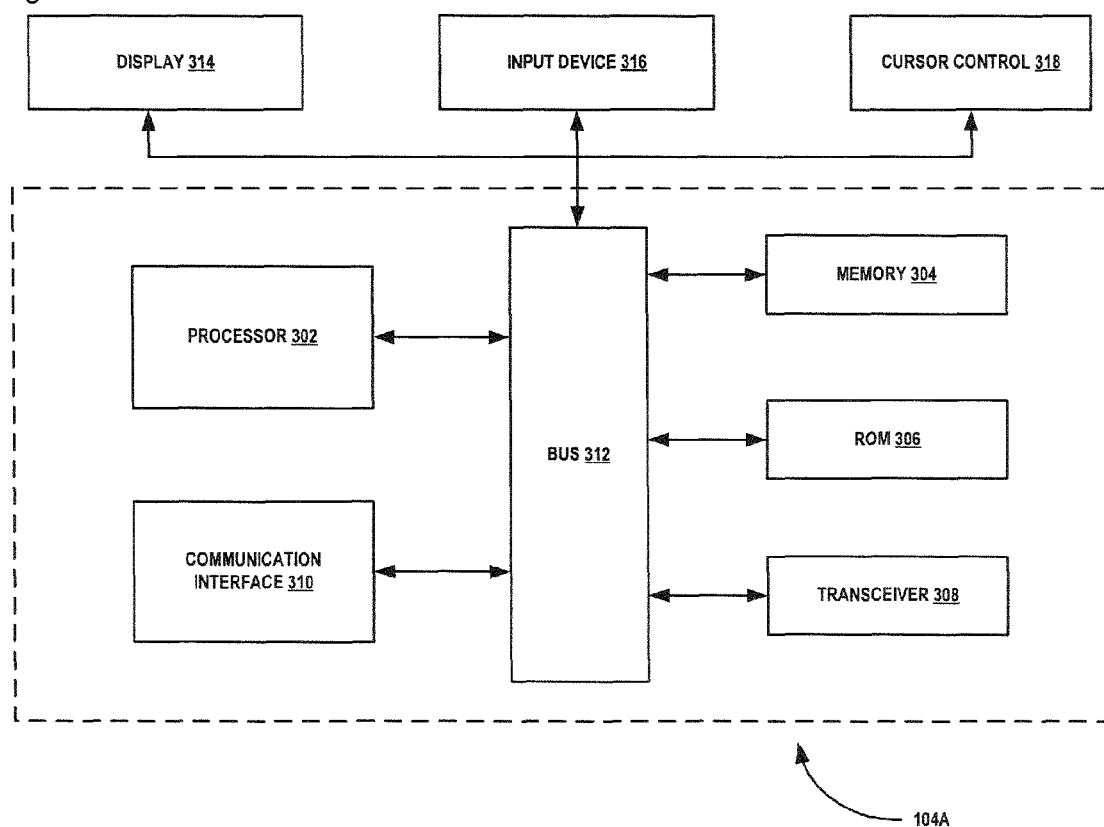
FIG. 3 is a block diagram illustrating an MTC device according to an embodiment of the present invention.

FIG. 3 is a block diagram illustrating an MTC device according to an embodiment of the present invention.

Referring to FIG. 3, the MTC device 104A includes a processor 302, a memory 304, a Read Only Memory (ROM) 306, a transceiver 308, a bus 312, a communication interface 310, a display 314, an input device 316, and a cursor control 318.

The processor 302, as used herein, may be any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 302 may also include embedded controllers, such as generic or programmable logic devices or arrays, application specific integrated circuits, single-chip computers, smart cards, and the like.

The memory 304 and the ROM 306 may be a volatile memory and a non-volatile memory. The memory 304 temporarily stores instructions to establish a connection with a base station, according to an embodiment of the present invention. For example, when the instructions stored in the memory 304 are executed by the processor 302, the processor 302 performs the method illustrated in FIG. 2.

A variety of computer-readable storage media may be stored in and accessed from the memory elements. Memory elements may include any suitable memory device(s) for storing data and machine-readable instructions, such as a Random Access Memory (RAM), an Erasable Programmable ROM (EPROM), an Electrically EPROM (EEPROM), a hard drive, a removable media drive for handling memory cards, Memory Sticks®, etc.

The above-described embodiments of the present invention may also be implemented in conjunction with modules, including functions, procedures, data structures, and application programs, for performing tasks, or defining abstract data types or low-level hardware contexts. Machine-readable instructions stored on any of the above-mentioned storage media may be executable by the processor 302. For example, a computer program may include machine-readable instructions capable of establishing a connection with the base station 102 using mRACH parameters, according to an embodiment of the present invention.

For example, a program may be included on a storage medium and loaded from the storage medium to a hard drive in the non-volatile memory. The machine-readable instructions cause the MTC device 104A to encode according to an embodiment of the present invention.

The bus 312 interconnects various components of the MTC device 104A. The components, e.g., the transceiver 308, communication interfaces 310, the display 314, the input device 316, and the cursor control 318 are well known to a person of ordinary skill in the art, and hence, a detailed explanation thereof is omitted herein.

Additionally, the various devices, modules, selectors, estimators, etc., described herein may be embodied and operated using hardware circuitry, for example, complementary metal oxide semiconductor based logic circuitry, firmware, and/or any combination of hardware, firmware, and/or software embodied in a machine readable medium. For example, the various electrical structures and methods may be embodied using transistors, logic gates, and electrical circuits, such as application specific integrated circuit.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

The invention claimed is:

1. A method of a machine type communication (MTC) device for establishing a connection with a base station in a wireless communication network environment, the method comprising:
    receiving, by the MTC device, a broadcast message from a base station on a machine-to-machine (M2M) broadcast control channel, wherein the broadcast message includes header information and at least one M2M random access channel (mRACH) parameter;
    identifying whether a traffic flow indicator (TFI) included in the header information is associated with a TFI in the MTC device;
    transmitting an mRACH message requesting an uplink connection based on the at least one mRACH parameter if the TFI included in the header information is associated with the TFI in the MTC device; and
    receiving a resource assignment message indicating a successful connection establishment with the base station, in response to the mRACH message.

2. The method of claim 1, further comprising:
    ignoring the broadcast message received from the base station if the mRACH message cannot be transmitted to the base station.

3. The method of claim 1, further comprising:
    if the TFI included in the header information is not associated with the TFI associated with the MTC device, ignoring the broadcast message received from the base station.

4. The method of claim 1, further comprising:
    identifying whether a universal standard flag (USF) included in the header information is associated with a USF associated with the MTC device;
    if the USF included in the header information is associated with USF associated with the MTC device, transmitting the mRACH message based on the at least one mRACH parameter;
    if the USF included in the header information is not associated with the USF associated with the MTC device, ignoring the broadcast message received from the base station.

5. The method of claim 1, further comprising:
    transmitting a notification to the base station if network access behavior associated with the MTC device is periodic; and
    receiving allocation of a reserved radio block period (RRBP) from the base station for communicating data with the base station.

6. The method of claim 1, wherein the at least one mRACH parameter comprises a maximum number of allowed retransmissions, a number of slots to spread transmission, a cell barred from access, and an allowed call re-establishment.

7. A machine type communication (MTC) device comprising:
    a processor; and
    a memory that temporarily stores instructions, that when executed by the processor, cause the processor to perform a method comprising:
    receiving, by the MTC device, a broadcast message from a base station on a machine-to-machine (M2M) broadcast control channel, wherein the broadcast message includes header information and at least one M2M-random access channel (mRACH) parameter;
    identifying whether a traffic flow indicator (TFI) included in the header information is associated with a TFI associated with the MTC device;
    transmitting an mRACH message requesting an uplink connection based on the at least one mRACH parameter if the TFI included in the header information is associated with the TFI in the MTC device; and
    receiving a resource assignment message indicating a successful connection establishment with the base station, in response to the mRACH message.

8. The MTC device of claim 7, wherein the method further comprises:
    ignoring the broadcast message received from the base station if the mRACH message cannot be transmitted to the base station.

9. The MTC device of claim 7, the method further comprises
    if the TFI included in the header information is not associated with the TFI associated with the MTC device, ignoring the broadcast message received from the base station.

10. The MTC device of claim 7, wherein the method further comprises:
   identifying whether a universal standard flag (USF) included in the header information is associated with a USF associated with the MTC device;
   if the USF included in the header information is associated with USF associated with the MTC device, transmitting the mRACH message based on the at least one mRACH parameter;
   if the USF included in the header information is not associated with the USF associated with the MTC device ignoring the broadcast message received from the base station.

11. The MTC device of claim 7, wherein the method further comprises:
   transmitting a notification to the base station if network access behavior associated with the MTC device is periodic; and
   receiving allocation of a reserved radio block period (RRBP) from the base station for communicating data with the base station.

12. The MTC device of claim 7, wherein the at least one mRACH parameter comprises a maximum number of allowed retransmissions, a number of slots to spread transmission, a cell barred from access, and an allowed call re-establishment.

* * * * *